United States Patent
Bulkowski et al.

(10) Patent No.: US 8,775,464 B2
(45) Date of Patent: Jul. 8, 2014

(54) METHOD AND SYSTEM OF MAPREDUCE IMPLEMENTATIONS ON INDEXED DATASETS IN A DISTRIBUTED DATABASE ENVIRONMENT

(71) Applicants: Brian J. Bulkowski, Menlo Park, CA (US); Srini V. Srinivasan, Sunnyvale, CA (US)

(72) Inventors: Brian J. Bulkowski, Menlo Park, CA (US); Srini V. Srinivasan, Sunnyvale, CA (US)

( * ) Notice: Subject to any disclaimer, the term of this patent is extended or adjusted under 35 U.S.C. 154(b) by 0 days.

(21) Appl. No.: 13/653,411

(22) Filed: Oct. 17, 2012

(65) Prior Publication Data

US 2014/0108415 A1 Apr. 17, 2014

(51) Int. Cl.
 *G06F 17/30* (2006.01)
(52) U.S. Cl.
 CPC .... *G06F 17/30424* (2013.01); *G06F 17/30321* (2013.01)
 USPC .......................................... 707/769; 707/770
(58) Field of Classification Search
 USPC ................................................ 707/769, 770
 See application file for complete search history.

(56) References Cited

U.S. PATENT DOCUMENTS

| | | | | |
|---|---|---|---|---|
| 8,069,210 | B2 * | 11/2011 | Gillum et al. ................. | 709/206 |
| 8,230,070 | B2 * | 7/2012 | Buyya et al. .................. | 709/226 |
| 8,260,803 | B2 * | 9/2012 | Hsu et al. ...................... | 707/769 |
| 8,260,826 | B2 * | 9/2012 | Chen et al. .................... | 707/803 |
| 2010/0095374 | A1 * | 4/2010 | Gillum et al. .................... | 726/22 |
| 2010/0175049 | A1 * | 7/2010 | Ramsey et al. ............... | 717/115 |
| 2010/0281166 | A1 * | 11/2010 | Buyya et al. .................. | 709/226 |
| 2011/0055559 | A1 * | 3/2011 | Li et al. ......................... | 713/165 |
| 2011/0057751 | A1 * | 3/2011 | Feil et al. ...................... | 335/205 |
| 2012/0078951 | A1 * | 3/2012 | Hsu et al. ...................... | 707/769 |
| 2012/0078975 | A1 * | 3/2012 | Chen et al. .................... | 707/803 |
| 2012/0203823 | A1 * | 8/2012 | Manglik et al. ............... | 709/203 |

* cited by examiner

*Primary Examiner* — Baoquoc N To

(57) ABSTRACT

In one exemplary embodiment, a method of a distributed database system includes the step receiving a query in a query language from a client with a distributed database system. An index that matches the query is located. The index is pre-generated from a database table in the distributed database system. A map function of a MapReduce programming model is implemented using the index. A reduce function of the MapReduce programming model is implemented using the output of the map function. Optionally, a finalize function can be implemented using the output of the reduce function. The distributed database system can be a scalable NoSQL database. The reduce function can be optional when the value of the output of the map function is guaranteed to be unique.

8 Claims, 6 Drawing Sheets

METHOD AND SYSTEM OF MAPREDUCE IMPLEMENTATIONS ON INDEXED DATASETS IN A DISTRIBUTED DATABASE ENVIRONMENT

CROSS-REFERENCE TO RELATED APPLICATIONS

This application claims priority from and is a continuation-in-part of U.S. application Ser. No. 13/451,551, titled REAL-TIME TRANSACTION SCHEDULING IN A DISTRIBUTED DATABASE and filed Apr. 20, 2012. The application is hereby incorporated by reference in its entirety. U.S. application Ser. No. 13/451,551 claims priority from U.S. Provisional Application No. 61/478,940, titled DISTRIBUTED DATABASE SYSTEM WITH A CLUSTER OF AUTONOMOUS NODES and filed Apr. 26, 2011. The provisional application is hereby incorporated by reference in its entirety.

BACKGROUND

1. Field

This application relates generally to distributed database systems, and more specifically to a system and method of MapReduce implementations on indexed datasets in a distributed database environment.

2. Related Art

MapReduce is a programming model and an associated implementation for processing and generating large data sets. In one example, users can specify a map function that processes a key/value pair to generate a set of intermediate key/value pairs, and a reduce function that merges all intermediate values associated with the same intermediate key. Programs written in the MapReduce style can be parallelized and executed on a large cluster of distributed database machines. Typically, a run-time system can manage the details of partitioning the input data, scheduling the program's execution across a set of machines, handling machine failures, and managing the required inter-machine communication. This allows programmers without any experience with parallel and distributed systems to easily utilize the resources of a large distributed system.

However, current implementations of MapReduce may be performed over large data sets. For example, Hadoop tends to perform MapReduce over the entirety of a data store. The size of these data sets may result in higher latencies such that MapReduce may not be available in substantially real-time operations.

BRIEF SUMMARY OF THE INVENTION

In one exemplary embodiment, a method of a distributed database system includes the step receiving a query in a query language from a client with a distributed database system. An index that matches the query is located. The index is pre-generated from a database table in the distributed database system. A map function of a MapReduce programming model is implemented using the index. A reduce function of the MapReduce programming model is implemented using the output of the map function.

Optionally, a finalize function can be implemented using the output of the reduce function. The distributed database system can be a scalable NoSQL database. The reduce function can be optional when the value of the output of the map function is guaranteed to be unique.

In another exemplary embodiment, a distributed database system includes a client node that provides a query in a query language to the distributed database system. The distributed database system comprising a cluster of server nodes. A server node creates at least one index from a data store in the distributed database. The server node maintains the at least one index in a substantially current state based the data store. The server node receives a query from a client node. The server node matches the query to the at least one index when the query is received from the client node. The server node implements a map function of a Map Reduce programming model using the index.

Optionally, the server node can provide a map function output to the client node. The client node can implement a reduce function of the MapReduce programming model using the output of the map function. The client node can implement a finalize function using the output of the reduce function.

Optionally, the server node can implement a reduce function of the MapReduce programming model using the output of the map function. The server node can implement a finalize function using the output of the reduce function. The server node can then provide the output of the reduce function to the client node.

BRIEF DESCRIPTION OF THE DRAWINGS

The present application can be best understood by reference to the following description taken in conjunction with the accompanying figures, in which like parts may be referred to by like numerals.

DETAILED DESCRIPTION

Figure 1A:
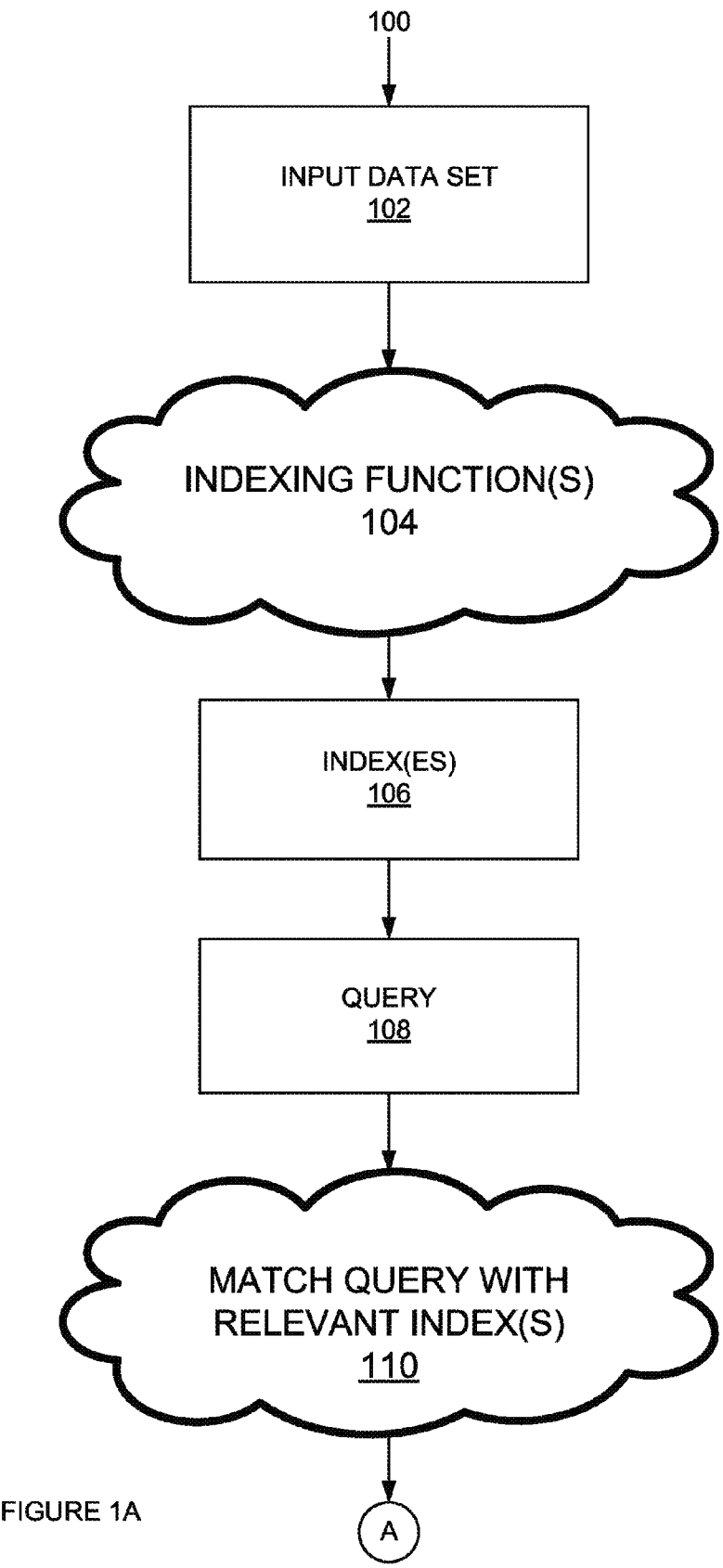
FIGS. 1A-B illustrate an exemplary process for extending a map-reduce operation in a distributed database, according to some embodiments.

Disclosed are a system, method, and article of MapReduce implementations on indexed datasets in a distributed database environment. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

EXEMPLARY PROCESSES

Figure 1B:
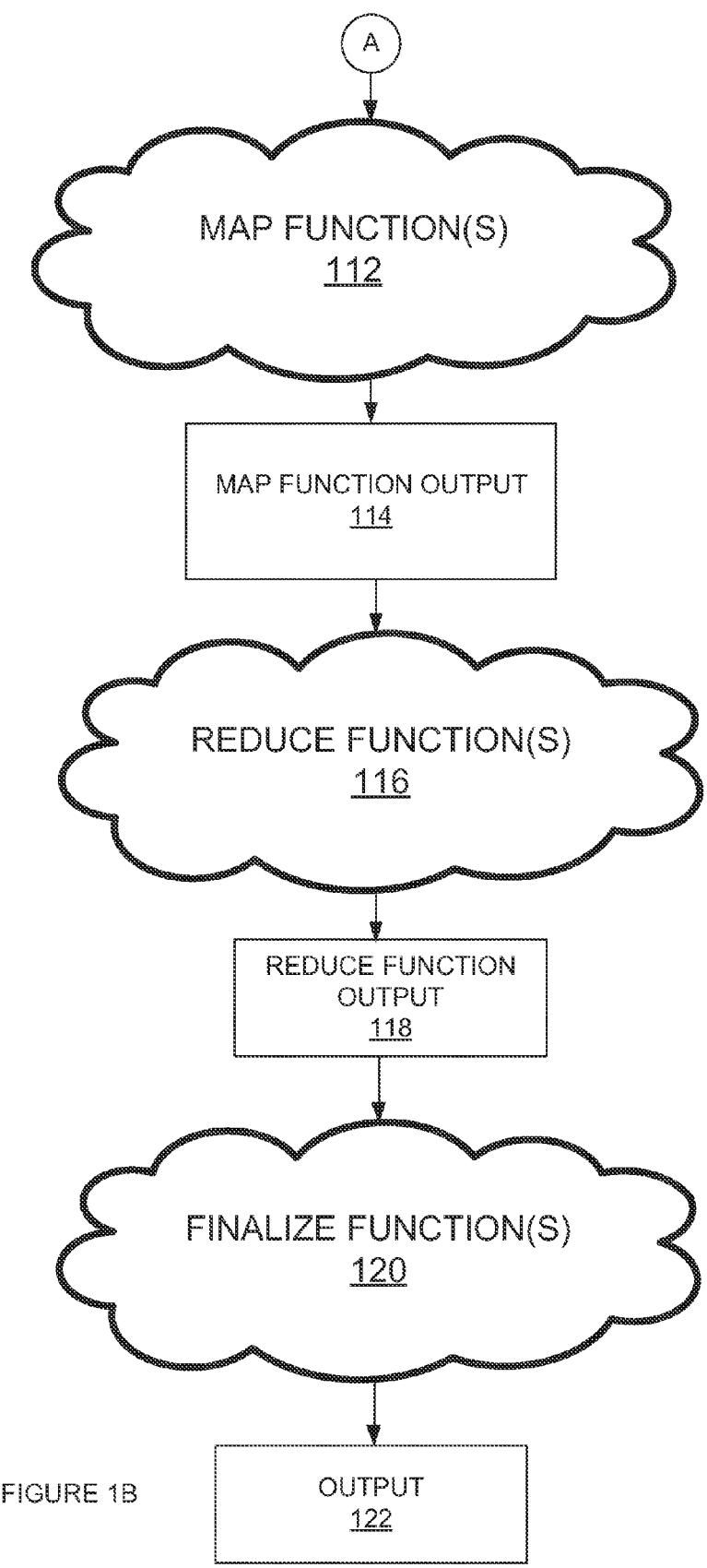

FIGS. 1A-B illustrate an exemplary process 100 for extending a map-reduce operation in a distributed database. In step 104 of process 100, data set 102 from a distributed database are input into one or more indexing functions to create at least one index 106. Data set 102 can be acquired from data in one or more nodes of a distributed database system such as the systems of FIGS. 3 and 4, infra. Typically, an index can be a data structure created using one or more columns of a database table, providing the basis for both rapid random lookups and efficient access of ordered records. Accordingly, various types of indexes 106 (e.g. bitmap, sparse, reverse, dense) can be built in step 104.

In another example embodiment, step 104 can generate other data structures that provide a subset of data set 102, such as a list of database predicates that can optionally take the place of indexes in the steps and operations of FIGS. 1A-B. A database predicate can be a way to subset the amount of data returned by a query (e.g. example, getting the record of one user, getting records that are created within a period etc.). A database predicate can specify a condition that has to be satisfied by the actual values in records in a database. It is noted that the results of a query (e.g. a compound WHERE clause, an index lookup, etc.) can be utilized to build a data set in step 104. It is further noted that index(es) 106 can be maintained in a current state based on various relevant modifications to input data set 102 (assuming runtime latencies and the like).

In step 108, a query can be received (e.g. from a database client). One or more indexes relevant to query 108 can be located in step 110. It is these matched indexes (and/or other data structures determined relevant to query 108) that can then be placed into various MapReduce functions. As used herein, MapReduce can include a programming model for processing large data sets, such the of the model of the same name implemented by Google® and described, inter alia, in *MapReduce: Simplified Data Processing on Large Clusters* by Jeffrey Dean and Sanjay Ghemawat in OSDI'04: Sixth Symposium on Operating System Design and Implementation, San Francisco, Calif., December, 2004. It is noted that a MapReduce implementation can include such elements as, inter alia, an input reader, a map function 112, a partition function, a compare function, a reduce function 116, an output writer and the like.

For example, in step 112, the matched indexes can be placed into at least one map function. An input reader (not shown) can divide the input into appropriate size 'splits' and the framework can assign one split to each map function 112. The input reader reads data from stable storage (typically a distributed file system) and generates key/value pairs. The map step can include a master node which takes the input, divides it into smaller sub-problems, and distributes them to worker nodes. A worker node may do this again in turn, leading to a multi-level tree structure. The worker node processes the smaller problem, and passes the answer back to its master node. From a logical view, map function(s) 112 can take a pair of data with a type in one data domain, and returns a list of pairs in a different domain: Map(k1,v1)→list(k2,v2). It is noted that map function(s) 108 can be run on the servers that maintain the data.

Continuing with the example, map function(s) output 114 can be allocated to a particular reducer by the application's partition function for sharding purposes. The partition function can be given the key and the number of reducers and return the index of the desired reduce. A typical default is to hash the key and modulo the number of reducers. Between the map function 112 and reduce function 116 stages, the data can be shuffled (e.g. parallel-sorted/exchanged between nodes) in order to move the data from the map node that produced it to the shard in which it will be reduced. The input for reduce function(s) 116 can be pulled from the machine where the map function 112 ran and sorted using the application's comparison function.

In reduce function(s) 116, the master node can then collect the answers to all the sub-problems and combines them in some way to form the output—the answer to the problem it was originally trying to solve. Reduce function 116 can be called once for each unique key in the sorted order. Reduce function 116 can then be iterated through the values that are associated with that key and produce zero or more outputs. Logically, the reduce function is applied in parallel to each group, which in turn produces a collection of values in the same domain: Reduce(k2, list (v2))→list(v3). Each reduce function 116 call typically produces either one value of v3 or an empty return, though one call can be allowed to return more than one value. The returns of all calls can be collected as the desired reduce function output 118 (e.g. as a result list). In this way, the MapReduce framework transforms a list of (key, value) pairs into a list of values. It is noted that reduce function 116 can be optional such as when the value of output 114 of map function 112 is guaranteed to be unique.

Finalize function(s) 120 may be ran after reduce function 116. Such a function may be optional and is not necessary for many map/reduce cases. The finalize function can take a list of key/value pairs of reduce function output 118, and return a finalized value such as another list of key/value pairs (e.g. a list to a list) in output 122. In some examples, finalize function(s) 120 can be utilized to limit a number of results.

Figure 2:
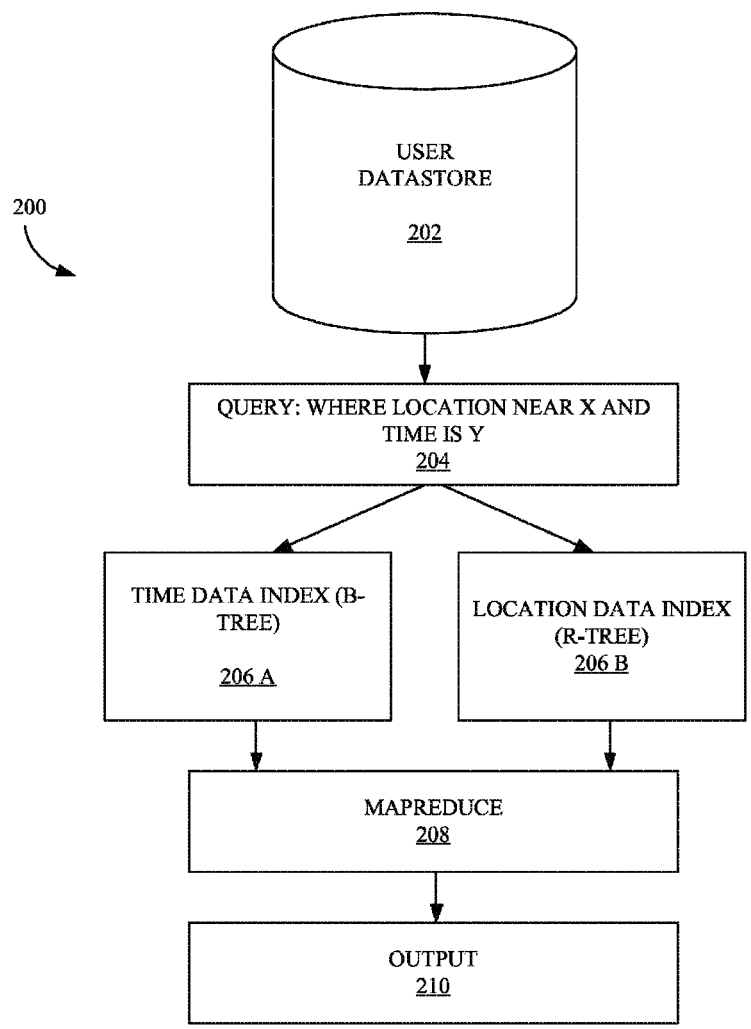
FIG. 2 depicts a flow diagram of an example process of implementing MapReduce function(s) on indexed data sets in a distributed database environment, according to an example embodiment.

FIG. 2 depicts a flow diagram of an example process 200 of implementing MapReduce function(s) on indexed data sets in a distributed database environment. FIG. 2 depicts a user data store 202. User data store 202 can include a database of information about users of mobile devices. The user's mobile system can collect and store various user-related data related to the mobile service (e.g. user profile information, location information, time-stamp data, mobile-use information, and the like). User data store 202 can thus comprise a large data set. A database administrator can submit query 204 to user data store 202. Query 204 can be matched with one or more pre-generated indexes (e.g. copies of parts of tables that constitute user data store 202). In this particular example, query 204 includes a WHERE clause: "WHERE location near X AND time is Y" (with 'X' and 'Y' being arbitrary values), in this way, time data index 206 A and location data index 206 B can be located. In step 208, a MapReduce implementation can then be run using indexes 206 A-B resulting in output 210. The latency period of the MapReduce implementation step can be dramatically reduced by running it on the filtered datasets 206 A-B in lieu of directly on user data store 202.

EXEMPLARY ENVIRONMENT AND ARCHITECTURE

Figure 3:
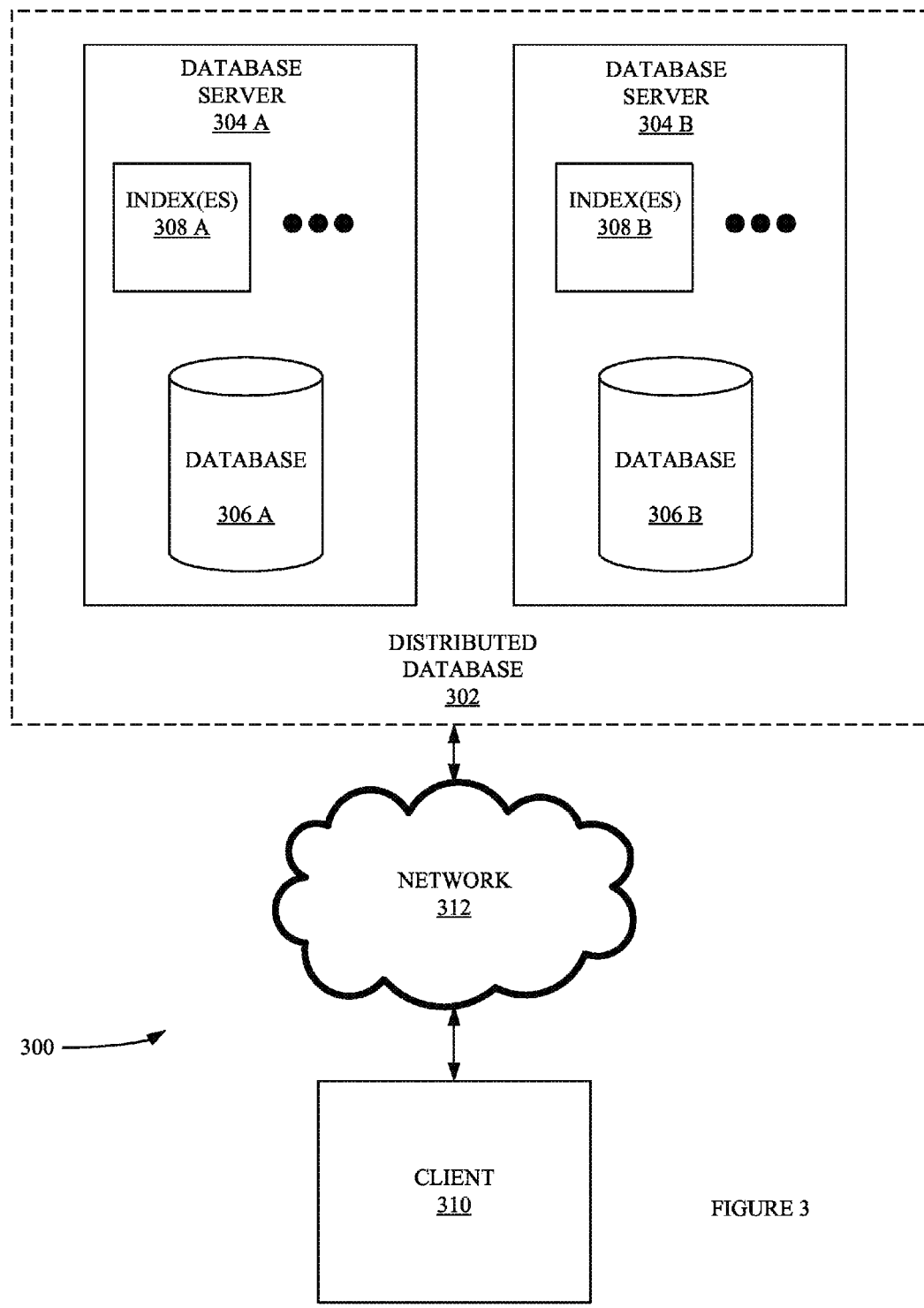
FIG. 3 depicts a block diagram of a system of MapReduce implementations on indexed datasets in a distributed database system (DDBS), according to an example embodiment.

FIG. 3 depicts a block diagram of a system of MapReduce implementations on indexed datasets in a distributed database system (DDBS) 302, according to an example embodiment. In this particular example, client 310 can submit a query (e.g. query 204) to distributed database system (DDBS) 302. DDBS 302 can include database servers 304 A-B (as well as additional n-number of database servers).

Database servers 304 A-B can build and maintain indexes 308 A-B. Indexes 308 A-B can be built from databases 306 A-B. Indexes 308 A-B can be updated when related data in databases 306 A-B is modified. For example, databases 306 A-B can be the user data store 202 of FIG. 2 and indexes 308 A-B can include 206 A-B. Indexes 308 A-B can be built in response to a query from client 310. Database servers 304 A-B can implement a map function using the indexes 308 A-B. It is noted that database servers 304 A-B can operate in parallel without any interdependency. Thus, the query can be submitted to all the relevant servers in DDBS 302. Optionally, the results can be communicated to client 310. Client 310 can then implement reduce and/or finalize operations.

It is noted, however, the reduce and/or finalize functions can alternatively be implemented at the server side (e.g. depending on optimal access patterns). In this way, network throughput can be increased. It is further noted that, in some embodiments, the indexed data can be located in a separate database server than the underlying database.

Moreover, as noted previously, in some embodiments, the indexed data can be collocated with the underlying data store. In such a scenario, related data items relevant to certain access paths can also be collocated in a storage medium disk (e.g. rotational disk, solid state storage (SSD). An access path can refer to the path chosen by the system to retrieve data (e.g. in the event a structured query language (SQL) request is executed). For example, an access path related to a WHERE clause such as: "WHERE term A" where 'term A' can be an arbitrary term. A preconfigured access path of the data that matches term A can be collocated on the disk (e.g. as an index) with other indexed data. As new records are provided, the preconfigured access path can be updated. Compression algorithms can be applied to rows that are collocated in the same storage medium (e.g. the indexed data and the access path data). MapReduce functions can then be applied as discussed herein.

Figure 4:
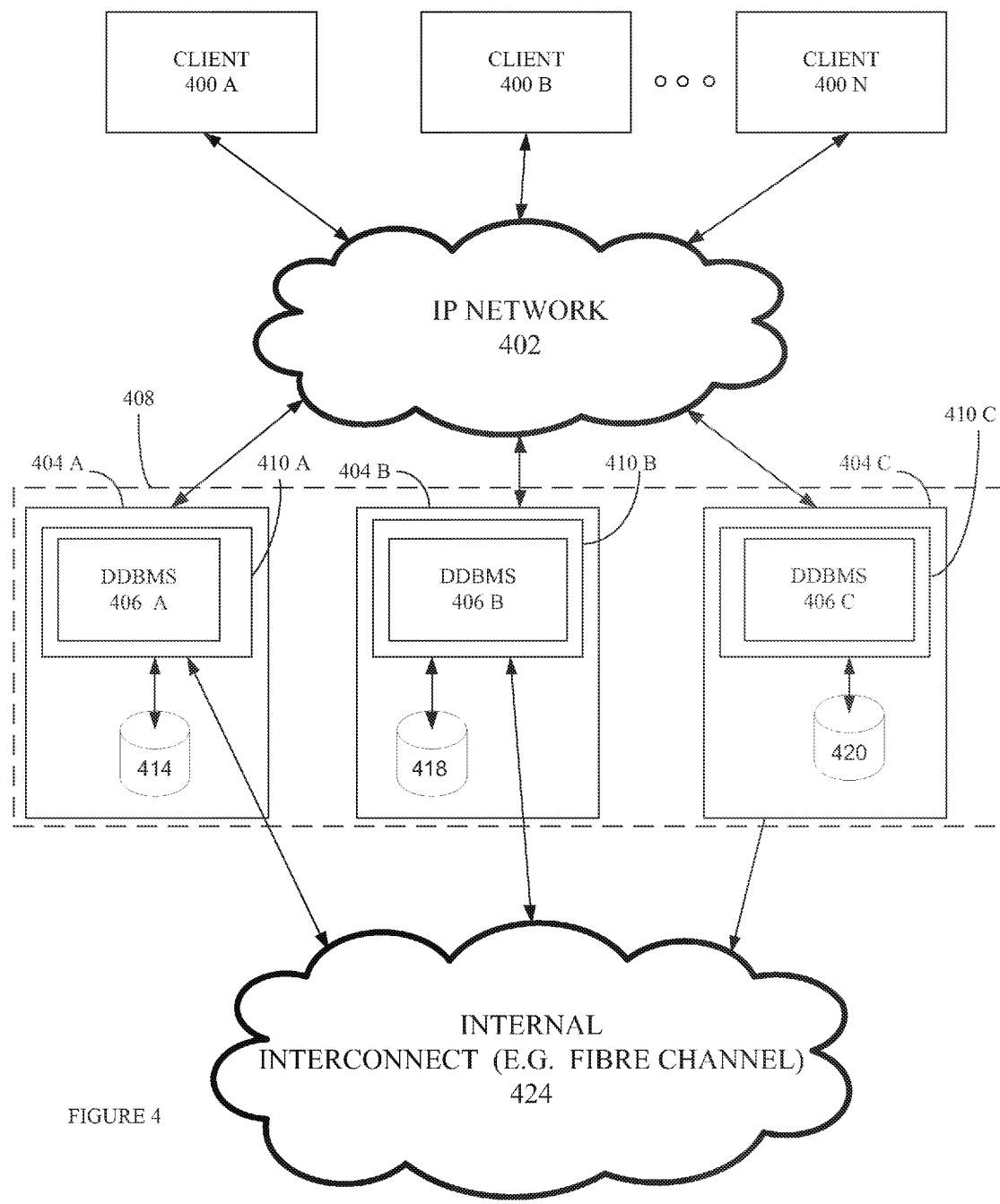
FIG. 4 shows, in a block diagram format, a distributed database system (DDBS) operating in a computer network, according to some embodiments.

FIG. 4 shows, in a block diagram format, a distributed database system (DDBS) operating in a computer network according to an example embodiment. The DDBS of FIG. 4 can typically be a collection of databases that can be stored at different computer network sites (e.g. a server node). Each database may involve different database management systems and different architectures that distribute the execution of transactions. The DDBS can be managed in such a way that it appears to the user as a centralized database.

The DDBS can be a distributed, scalable NoSQL database, according to some embodiments. The DDBS can include, inter alia, three main layers: a Client layer 400 A-N, a distribution layer 410 A-N and/or a data layer 412 A-N. Client layer 400 A-N can include various DDBS client libraries. Client layer 400 A-N can be implemented as a smart client. For example, Client layer 400 A-N can implement a set of DDBS application program interfaces (APIs) that are exposed to a transaction request. Client layer 400 A-N can also track cluster configuration and manage the transaction requests, making any change in cluster membership completely transparent to the customer application 404 A-N. Client layer 400 A-N can implement reduce and finalize functions as noted supra.

Nodes 404 A-C can communicate to clients 400 A-N via IP network 402. Internet-protocol (IP) network 402 can utilize a set of communications protocols used for the Internet and other similar networks. In some embodiments, IP network 402 may also include other means of data communication such as a local area network (LAN) that utilizes IEEE 802-type protocols, a telecommunications data network, or any combination thereof. Clients 400 A-N can be any application or process that communicates with nodes 404 A-C via IP network 402.

Nodes 404 A-C can include one or more central processing units (CPU), memory resources and permanent data storage systems. Database nodes 404 A-C can include distributed database management system (DDBMS) 406 A-C. DDBMS 406 A-C can include a set of computer programs that controls the creation, maintenance, and the use of distributed database of cluster 408. DDBMS 406 A-C manages the various data storage systems 414, 418 and 420 that comprise the distributed database as well as the data objects on the data storage systems. The particular example embodiment of FIG. 4 show's DDBMS 406 A-C as a distributed database manager layer. The DDBMS 406 A-C can include components that are able to execute database tasks on their respective servers 410 A-C, and to carry out functions (described infra) that relate to the operation of the DDBS in cluster 408.

At the application layer of the database nodes 404 A-C can manage the processing of data transactions. For the sake of simplicity, not all the components of nodes 404 A-C are shown. However, it will be appreciated that nodes 404 A-C can include other components. For example, DDBMS 406 A-C can include systems as lock managers, schedulers, meta-data managers, policy managers and the like. In some embodiments, nodes 404 A-C can be self-managing nodes that can reconfigure the cluster and repartition data within the cluster without a central administrative entity such as a database administrator (DBA).

Nodes 404 A-C can be linked together via an internal cluster interconnect 424 such as a Fibre Channel network. Fibre Channel protocols can use a transport protocol (similar to TCP used in IP networks) which predominantly transport small computer system interface (SCSI) commands over a Fibre Channel network. SCSI commands are typical a set of standards for physically connecting and transferring data between computers and peripheral devices. In some embodiments, TCP/IP protocols can be used to communicate between nodes.

Additionally, nodes 404 A-C can also include one or more data storage devices 414, 418 and 420 (e.g. a dynamic random-access memory (DRAM), rotating hard disk, solid-state drive (SSD), or any combination thereof) or file systems. Each data storage device 414, 418 and 420 can have a set of metadata that uniquely identifies the data it stores and the data attributes (e.g. time stamps and the like) to the DDBMS that manages the particular storage device.

An SSD device can be a data storage device that uses solid-state memory to store persistent data with the intention of providing access in the same manner of a block input/output hard disk drive. DRAM can be a type of random-access memory that stores each bit of data in a separate capacitor within an integrated circuit. The capacitor can be either charged or discharged; these two states are taken to represent the two values of a bit (0 and 1). A hard-disk drive can be a non-volatile magnetic data storage device in which data is digitally recorded by various electronic, magnetic, optical, or mechanical methods on a surface layer deposited on one or more planar, round and rotating platters.

Distribution layer 410 A-N can be implemented as one or more server cluster nodes 408 A-N. Cluster nodes 408 A-N can communicate to ensure data consistency and replication across the cluster. Distribution layer 410 A-N can use a shared-nothing architecture. The shared-nothing architecture can be linearly scalable. Distribution layer 410 A-N can perform operations to ensure database properties that lead to the consistency and reliability of the DDBS. These properties can include atomicity, consistency, isolation, and durability.

In addition, distribution layer 410 A-N can ensure that the cluster remains fully operational when individual server nodes are removed from or added to the cluster. On each server node, a data layer 412 A-N can manage stored data on disk. Data layer 412 A-N can maintain indices corresponding to the data in the node. Furthermore, data layer 412 A-N be optimized for operational efficiency, for example, indices can be stored in a very tight format to reduce memory requirements, the system can be configured to use low level access to the physical storage media to further improve performance and the like. It is noted, that in some embodiments, no additional cluster management servers and/or proxies need be set up and maintained other than those depicted in FIG. 4.

Figure 5:
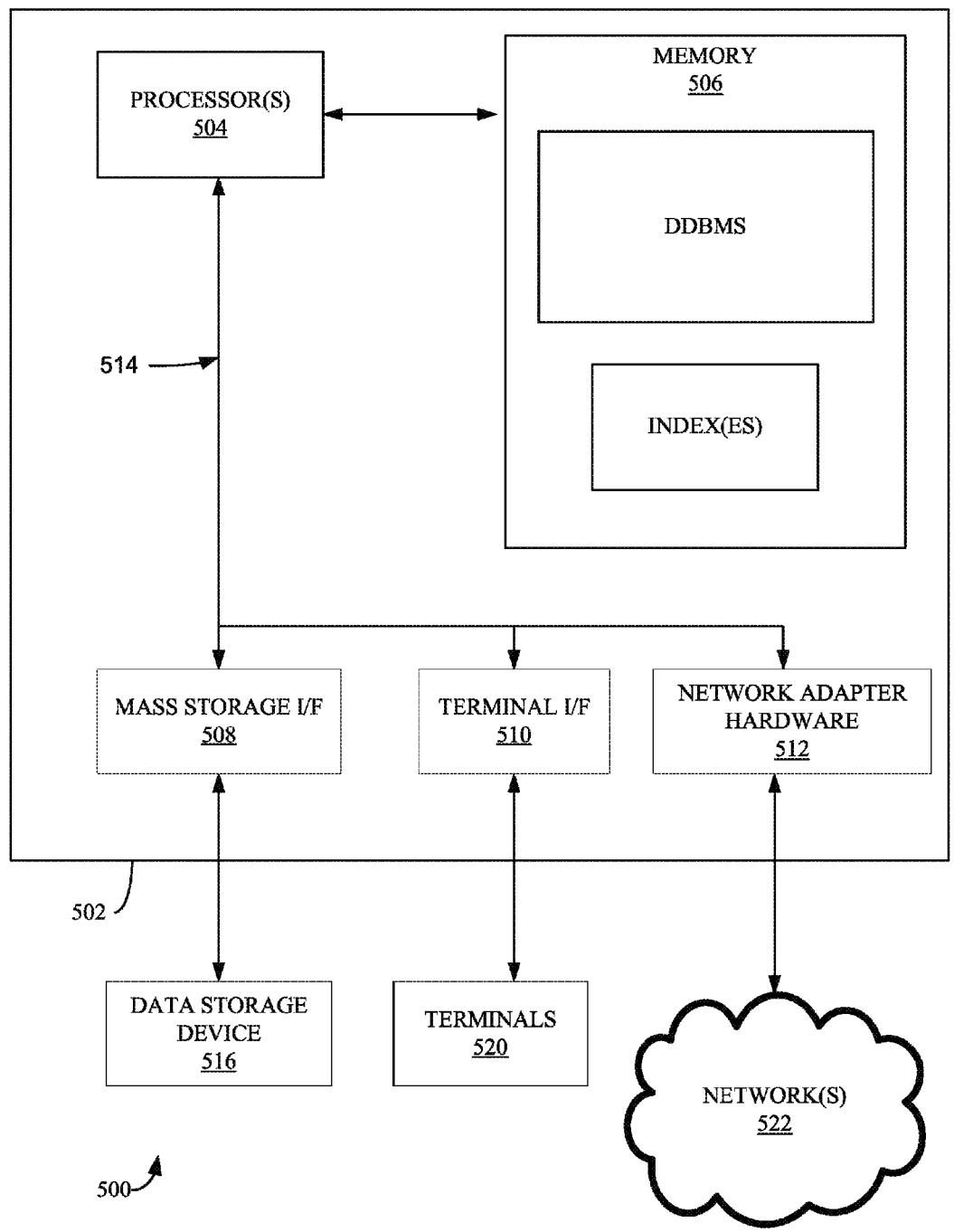
FIG. 5 is a block diagram illustrating a computing system, according to some embodiments.

FIG. 5 depicts an exemplary computing system 500 configured to perform any one of the processes described herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 is a block diagram illustrating a computing system 500. The computing system 500 is based upon a suitably configured processing system adapted to implement one or more exemplary embodiments. Any suitably configured processing system can similarly be used as the computing system 500 by embodiments such as servers residing in cluster nodes, a personal computer, workstation, a distributed database server, or the like. The computing system 500 includes a computer 502. The computer 502 has a processors) 504 ("CPU") that is connected to a memory 506, mass storage interface 508, terminal interface 510, and network adapter hardware 512. A system bus 514 interconnects these system components. The mass storage interface 508 is used to connect mass storage devices, such as data storage device 516, to the computer 502. Examples of data storage devices 516 can include those examples discussed supra (e.g. rotating hard disk systems, SSD flash systems, DRAM, and the like), as well others such as optical drives. Data storage device 516 may be used to store data to and read data from a computer-readable medium or storage product.

Memory 506, in one embodiment, includes a distributed database management system (DDBMS) 505. In some example embodiments, memory 506 can also include one or more process and modules such as those discussed in FIGS. 1-4 supra (e.g. transaction processing module 306, index 402, etc.). Although illustrated as concurrently resident in the memory 506, it is clear that respective components of the memory 506 are not required to be completely resident in the memory 506 at all times or even at the same time. In one embodiment, the computer 502 utilizes conventional virtual addressing mechanisms to allow programs to behave as if they have access to a large, single storage entity, referred to herein as a computer system memory, instead of access to multiple, smaller storage entities such as the memory 506 and data storage device 516. In some embodiments, additional memory devices (such as a DRAM cache) can be coupled with computer 502 as well.

Although only one CPU 504 is illustrated for computer 502, computer systems with multiple CPUs can be used equally effectively. Some embodiments can further incorporate interfaces that each includes separate, fully programmed microprocessors that are used to off-load processing from the CPU 504. Terminal interface 510 is used to directly connect one or more terminals 520 to computer 502 to provide a user interface to the computer 502. These terminals 520, which are able to be non-intelligent or fully programmable workstations, are used to allow system administrators and users to communicate with computer 502. The terminal 520 can also include other user interface and peripheral devices that are connected to computer 502 and controlled by terminal interface hardware included in the terminal I/F 510 that includes video adapters and interfaces for keyboards, pointing devices, and the like.

An operating system (not shown) included in the memory is a suitable multitasking operating system such as the Linux, UNIX, Windows XP, and Windows Server operating system. Embodiments are able to use any other suitable operating system. Some embodiments utilize architectures, such as an object oriented framework mechanism, that allows instructions of the components of operating system to be executed on any processor located within computer 502. The network adapter hardware 512 is used to provide an interface to a network 522. Some embodiments are able to be adapted to work with any data communications connections including present day analog and/or digital techniques or via a future networking mechanism.

Although the exemplary embodiments are described in the context of a fully functional computer system, those skilled in the art will appreciate that embodiments are capable of being distributed as a program product via CD or DVD, e.g., a CD ROM, or other form of recordable media, or via any type of electronic transmission mechanism. At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, and Java) or some specialized application-specific language.

Although the present embodiments have been described with reference to specific example embodiments, various modifications and changes can be made to these embodiments without departing from the broader spirit and scope of the various embodiments. For example, the various devices, modules, etc, described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium. Additionally, in some example embodiments, the systems of FIGS. 3-5 can be utilized to implement the steps and processes of FIGS. 1-2,

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method in a distributed database system comprising:
receiving a query in a query language from a client with a distributed database system, wherein the distributed database system comprises a scalable Not Only Structured Query Language (NoSQL) database implemented with a shared-nothing architecture;
locating an index that matches the query, wherein the index is pre-generated from a database table in the distributed database system, wherein the query comprises a WHERE clause, and wherein the index comprises a data structure created using one or more columns of the database table based on the WHERE clause;
implementing a map function of a MapReduce programming model using the index;
implementing a reduce function of the MapReduce programming model using the output of the map function, wherein the reduce function is not performed when the value of the output of the map function is unique; and
implementing a finalize function using the output of the reduce function, wherein the finalize function obtains a list of key/value pairs of a reduce function output and returns a finalized value and returns another list of key/value pairs as an output.

2. The method of claim 1 wherein the map function comprises:
obtaining a series of key/value pairs; and
processing each key/value pair to generate zero or more output key/value pairs.

3. A non-transitory computer-readable medium comprising program instructions for MapReduce implementations on indexed datasets in a distributed database environment, wherein execution of the program instructions by one or more processors of a computer system causes the one or more processors to carry out the steps of:
receiving, with at least one processor, a query in a query language from a client with a distributed database system, wherein the distributed database system comprises a scalable Not Only Structured Query Language (NoSQL) database with a shared-nothing architecture;
locating an index that matches the query, wherein the index is pre-generated from a database table in the distributed database system, and wherein the index is maintained substantially current with a relevant modification of the database table;
executing a map function of a MapReduce programming model using the index;
executing a reduce function of the MapReduce programming model using the output of the map function; and
executing a finalize function on an output of the reduce function, wherein the finalize function comprises receiving a key and a value of the reduce function output and returns a finalized value in a list format.

4. A distributed database system comprising:
a client node that provides a query in a query language to the distributed database system, wherein the client node implements a finalize function using an output of a reduce function of a server node, and wherein the finalize function obtains a list of key/value pairs of a reduce function output and returns a finalized value and returns another list of key/value pairs as an output;
a distributed database system comprising a cluster of server nodes, wherein the distributed database system comprises a scalable Not Only Structured Query Language (NoSQL) database with a shared-nothing architecture; and
a server node that:
creates, with at least one processor, at least one index from a data store in the distributed database,
maintains the at least one index in a substantially current state based on the data store, receives a query from a client node,
matches the query to the at least one index when the query is received from the client node,
implements a map function of a MapReduce programming model using the index,
implements the reduce function of the MapReduce programming model using the output of the map function, and
provides the output of the finalize function or the output of the reduce function to the client node.

5. The distributed database system of claim 4, wherein the server node provides a map function output to the client node.

6. The distributed database system of claim 5, wherein the client node implements a reduce function of the MapReduce programming model using the output of the map function.

7. The distributed database system of claim 6, wherein the server node implements the finalize function using the output of the reduce function.

8. The distributed database system of claim 4, wherein the server node creates at least one index based on the query from the client node.

* * * * *